(12) United States Patent
Tumey et al.

(10) Patent No.: US 11,526,303 B2
(45) Date of Patent: Dec. 13, 2022

(54) SYSTEMS AND METHODS FOR MULTI-TIERED DATA STORAGE ABSTRACTION LAYER

(71) Applicant: Johnson Controls Technology Company, Auburn Hills, MI (US)

(72) Inventors: Carol T. Tumey, Wauwatosa, WI (US); Michael F. Jaeger, Thiensville, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/009,989

(22) Filed: Sep. 2, 2020

(65) Prior Publication Data

US 2022/0066695 A1 Mar. 3, 2022

(51) Int. Cl.
*G06F 3/06* (2006.01)
*G06F 12/0802* (2016.01)
*G05B 19/042* (2006.01)

(52) U.S. Cl.
CPC ............ *G06F 3/0659* (2013.01); *G06F 3/061* (2013.01); *G06F 3/065* (2013.01); *G06F 3/068* (2013.01); *G06F 12/0802* (2013.01); *G05B 2219/25011* (2013.01); *G05B 2219/2614* (2013.01)

(58) Field of Classification Search
None
See application file for complete search history.

(56) References Cited

U.S. PATENT DOCUMENTS

| | | | |
|---|---|---|---|
| 9,762,670 B1 | 9/2017 | Grove et al. | |
| 10,095,800 B1 | 10/2018 | Yalamanchi | |
| 10,353,634 B1* | 7/2019 | Greenwood | G06F 3/0619 |
| 2014/0208018 A1* | 7/2014 | Benhase | G06F 12/0806 711/113 |
| 2014/0229656 A1* | 8/2014 | Goss | G06F 3/061 711/103 |
| 2015/0317330 A1 | 11/2015 | Bolotskikh et al. | |
| 2016/0077750 A1* | 3/2016 | Erdmann | G06F 3/0685 711/114 |
| 2018/0232459 A1* | 8/2018 | Park | G06F 16/2477 |
| 2019/0065382 A1* | 2/2019 | Velayuthaperumal | G06F 12/0868 |
| 2019/0171365 A1* | 6/2019 | Power | G06F 3/067 |

\* cited by examiner

*Primary Examiner* — Michael Alsip
(74) *Attorney, Agent, or Firm* — Foley & Lardner LLP

(57) ABSTRACT

A multi-tiered data storage system for building management system (BMS) data includes a plurality of data stores including a first data store and a second data store. The system further includes a data access router configured to provide a consistent endpoint for the BMS data to an application that provides or consumes the BMS data regardless of whether the BMS data is stored in the second data store or the first data store, obtain a requested data object of the BMS data from the second data store in response to a determination that the requested data object is available in the second data store, and obtain the requested data object from the first data store in response to a determination that the requested data object is not available in the second data store.

22 Claims, 15 Drawing Sheets

SYSTEMS AND METHODS FOR MULTI-TIERED DATA STORAGE ABSTRACTION LAYER

BACKGROUND

The present disclosure relates generally to building management systems. More particularly, the present disclosure relates to systems and methods for data storage in building management systems.

As building automation continues to transition from on premise processing to cloud processing, data storage requirements continue to grow while the number of different types of data stores (e.g., relational, document, time series, etc.) continue to proliferate. Greater levels of data storage and more types of storage for each level results in increased complexity of software that requires access to the data. This increased complexity can be problematic to application developers because the most recent version of the data or the fastest data storage device may change dynamically and can be difficult to anticipate when developing applications that rely on the data as an input.

SUMMARY

One implementation of the present disclosure is a multi-tiered data storage system for building management system (BMS) data. The data storage system includes a plurality of data stores including a first data store configured to store the BMS data and a second data store configured to store a redundant copy of at least a portion of the BMS data stored in the operational data store. The data storage system further includes a data access router configured to provide a consistent endpoint for the BMS data to an application that provides or consumes the BMS data regardless of whether the BMS data is stored in the second data store or the first data store. The data access router is further configured to obtain a requested data object of the BMS data from the second data store in response to a determination that the requested data object is available in the second data store. The data access router is further configured to obtain the requested data object from the first data store in response to a determination that the requested data object is not available in the second data store. In some embodiments, the first data store is an operational data store and the second data store is a cache data store.

In some embodiments, the plurality of data stores further include a reporting data store. In some embodiments, the data access router is configured to provide the consistent endpoint to the application that provides or consumes the BMS data regardless of whether the BMS data is stored in the cache data store, the operational data store, or the reporting data store.

In some embodiments, the requested data object includes at least one of a point data object including metadata describing a point in the BMS or a sample data object including a value of the point in the BMS.

In some embodiments, the data access router is configured to write the requested data object to the cache data store after retrieving the requested data object from the operational data store.

In some embodiments, the data access router is configured to write the requested data object to the cache data store response to a determination that the requested data object is a most recent version of the requested data object.

In some embodiments, the data access router is configured to receive a new data object of the BMS data from the application and write the new data object to both the cache data store and the operational data store.

In some embodiments, the operational data store is configured to store multiple values of a data object of the BMS data, the multiple values comprising a most recent value of the data object and one or more outdated values of the data object and the cache data store is configured to store only the most recent value of the data object.

In some embodiments, the data access router is configured to determine a data storage capability of each of the plurality of data stores, the data storage capability of a data store indicating one or more types of data objects that the data store is capable of storing, in response to receiving a new data object of the BMS data, determine a type of the new data object, and store the new data object in each data store of the plurality of data stores for which the data storage capability of the data store indicates that the data store is capable of storing the type of the new data object.

In some embodiments, the data access router is configured to determine whether the requested data object is a most recent version of the requested data object in response to a determination that the requested data object is available in the cache data store and remove the requested data object from the cache data store in response to a determination that the requested data object is not the most recent version of the requested data object.

Another implementation of the present disclosure is a method for storing data for a building management system (BMS). The method includes providing a consistent endpoint for BMS data to an application that provides or consumes the BMS data regardless of whether the BMS data is stored in a first data store or a second data store. The method further includes obtaining a requested data object of the BMS data from the second data store in response to a determination that the requested data object is available in the second data store. The method further includes obtaining the requested data object from the first data store in response to a determination that the requested data object is not available in the second data store. In some embodiments the first data store is configured to store the BMS data. In some embodiments, the second data store is configured to store a redundant copy of at least a portion of the BMS data stored in the first data store. In some embodiments, the first data store is an operational data store and the second data store is a cache data store.

In some embodiments, providing the consistent endpoint to the application that provides or consumes the BMS data regardless of whether the BMS data is stored in the cache data store, the operational data store, or a reporting data store.

In some embodiments, the requested data object includes at least one of a point data object comprising metadata describing a point in the BMS or a sample data object includes a value of the point in the BMS.

In some embodiments, the method further includes writing the requested data object to the cache data store after retrieving the requested data object from the operational data store.

In some embodiments, the method further includes writing the requested data object to the cache data store response to a determination that the requested data object is a most recent version of the requested data object.

In some embodiments, the method further includes receiving a new data object of the BMS data from the application an writing the new data object to both the cache data store and the operational data store.

In some embodiments, the operational data store is configured to store multiple values of a data object of the BMS data, the multiple values comprising a most recent value of the data object and one or more outdated values of the data object and the cache data store is configured to store only the most recent value of the data object.

In some embodiments, the method further includes determining a data storage capability of each of the plurality of data stores, the data storage capability of a data store indicating one or more types of data objects that the data store is capable of storing. In some embodiments, the further includes, in response to receiving a new data object of the BMS data, determining a type of the new data object. In some embodiments, the method further includes storing the new data object in each data store of the plurality of data stores for which the data storage capability of the data store indicates that the data store is capable of storing the type of the new data object.

In some embodiments, the method further includes determining whether the requested data object is a most recent version of the requested data object in response to a determination that the requested data object is available in the cache data store and removing the requested data object from the cache data store in response to a determination that the requested data object is not the most recent version of the requested data object.

Another implementation of the present disclosure is a building management device for storing building management system (BMS) data. The building management device includes one or more processing circuits configured to provide a consistent endpoint for BMS data to an application that provides or consumes the BMS data regardless of whether the BMS data is stored in a first data store or a second data store. The one or more processing circuits are further configured to obtain a requested data object of the BMS data from the cache data store in response to a determination that the requested data object is available in the second data store. The one or more processing circuits are further configured to obtain the requested data object from the operational data store in response to a determination that the requested data object is not available in the cache data store. In some embodiments, the first data store is configured to store the BMS data. In some embodiments, the second data store is configured to store a redundant copy of at least a portion of the BMS data stored in the first data store. In some embodiments, the first data store is an operational data store and the second data store is a cache data store.

In some embodiments, the one or more processors are further configured to provide the consistent endpoint to the application that provides or consumes the BMS data regardless of whether the BMS data is stored in the cache data store, the operational data store, or a reporting data store.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, A multi-tiered data storage system for building management system (BMS) data is shown, according to exemplary embodiments. The system can include several data stores, such as an operational data store configured to store the BMS data, a cache data store configured to store a redundant copy of at least a portion of the BMS data stored in the operational data store, and a reporting data store. The system may also include a data access router configured to receive data read requests or data write requests for one or more BMS devices via an application. The data access router may obtain a requested data object of the BMS data from the cache data store in response to a determination that the requested data object is available in the cache data store and/or obtain the requested data object from the operational data store in response to a determination that the requested data object is not available in the cache data store.

As disclosed herein, "data," "data sets," and "information" may all refer to various data objects under building automation protocols (e.g., BACnet, Modbus, etc.). Similarly "data object" may not necessarily refer to a data object as defined under BACnet protocols, and may refer to any type of data transmission, over wired or wireless connection. As disclosed herein, "data stores" may refer to any location in which data can be written to, retrieved from, or read from, including any type of primary memory (e.g., RAM, ROM, etc.) and/or secondary memory (e.g., hard drive, solid-state drive, etc.).

Building Management System and HVAC System

Building Site

Figure 1:
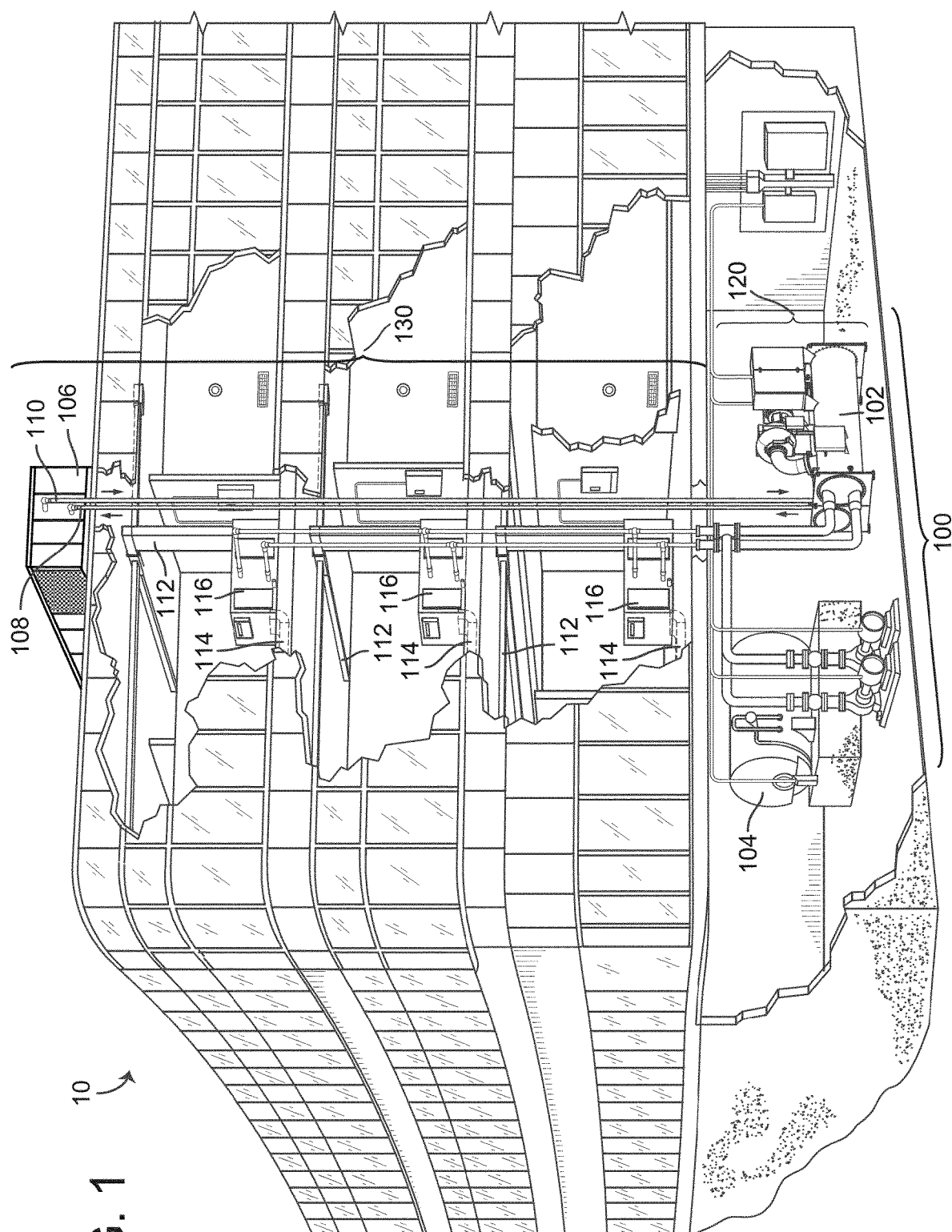
FIG. 1 is a drawing of a building with a heating, ventilation or air conditioning (HVAC) system, according to some embodiments.

Referring now to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Figure 2:
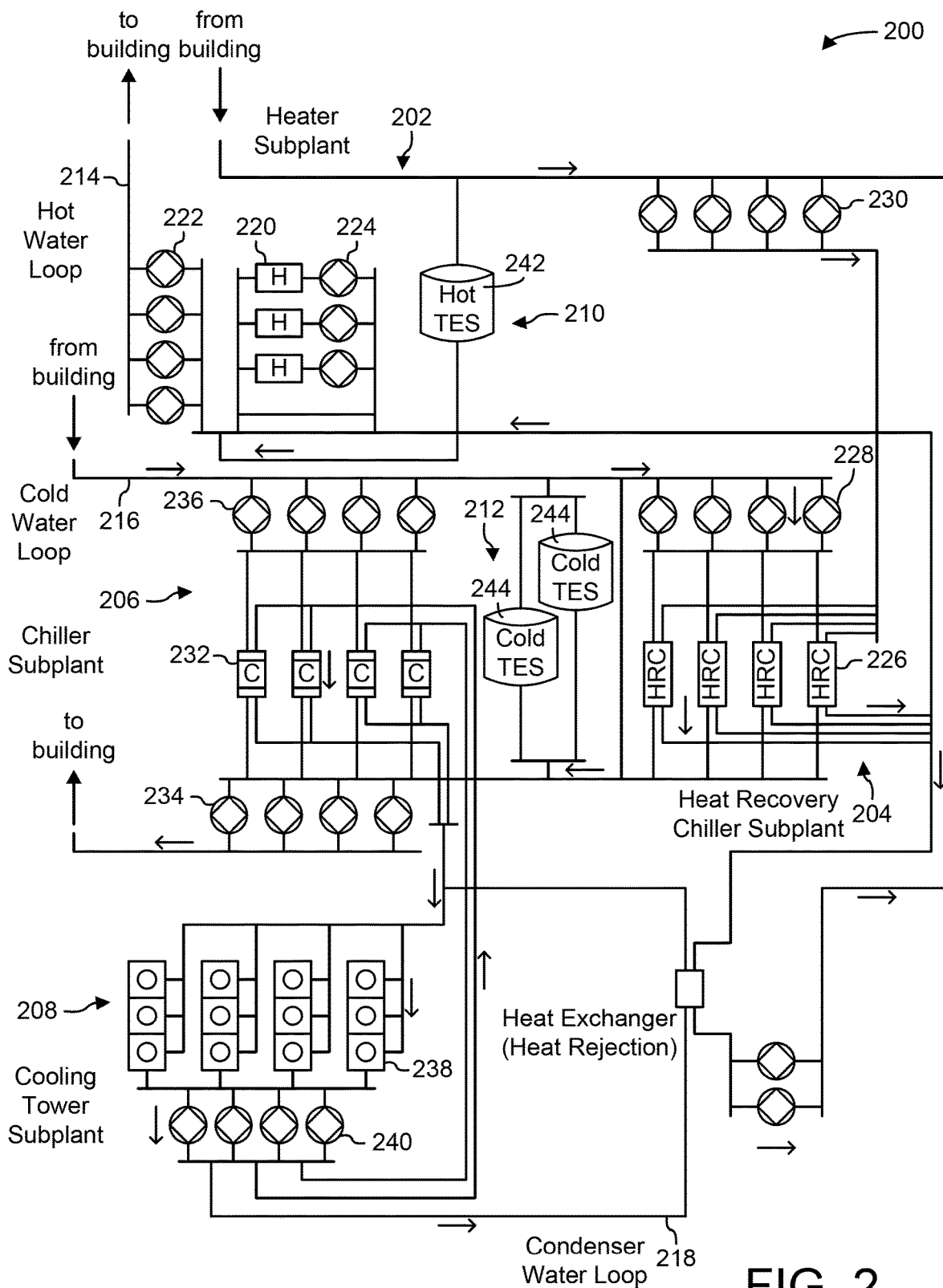
FIG. 2 is a schematic of a waterside system which can be used as part of the HVAC system of FIG. 1, according to some embodiments.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Airside System

Figure 3:
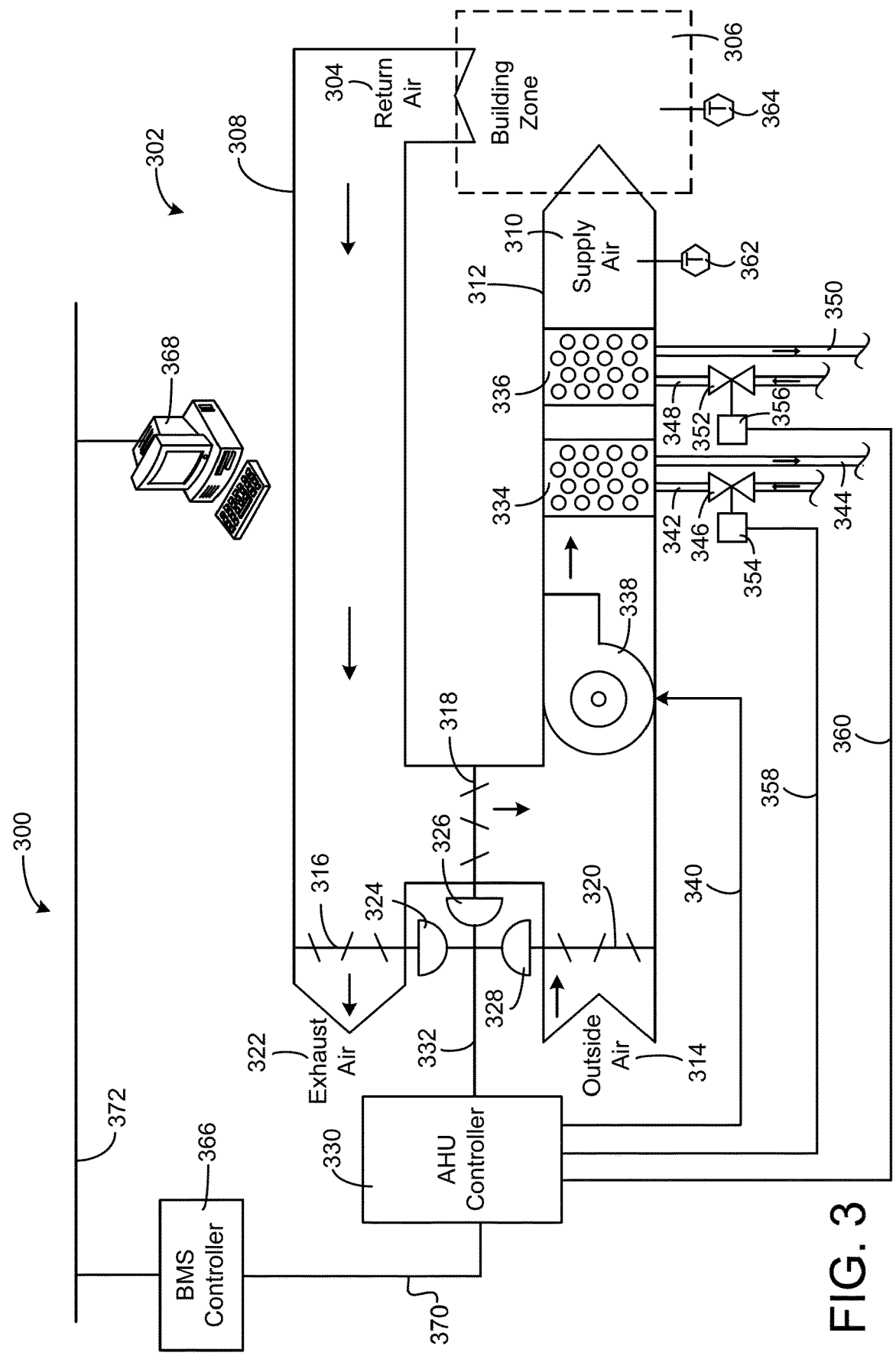
FIG. 3 is a diagram of an airside system, which can be used as part of the HVAC system of FIG. 1, according to some embodiments.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management System

Figure 4:
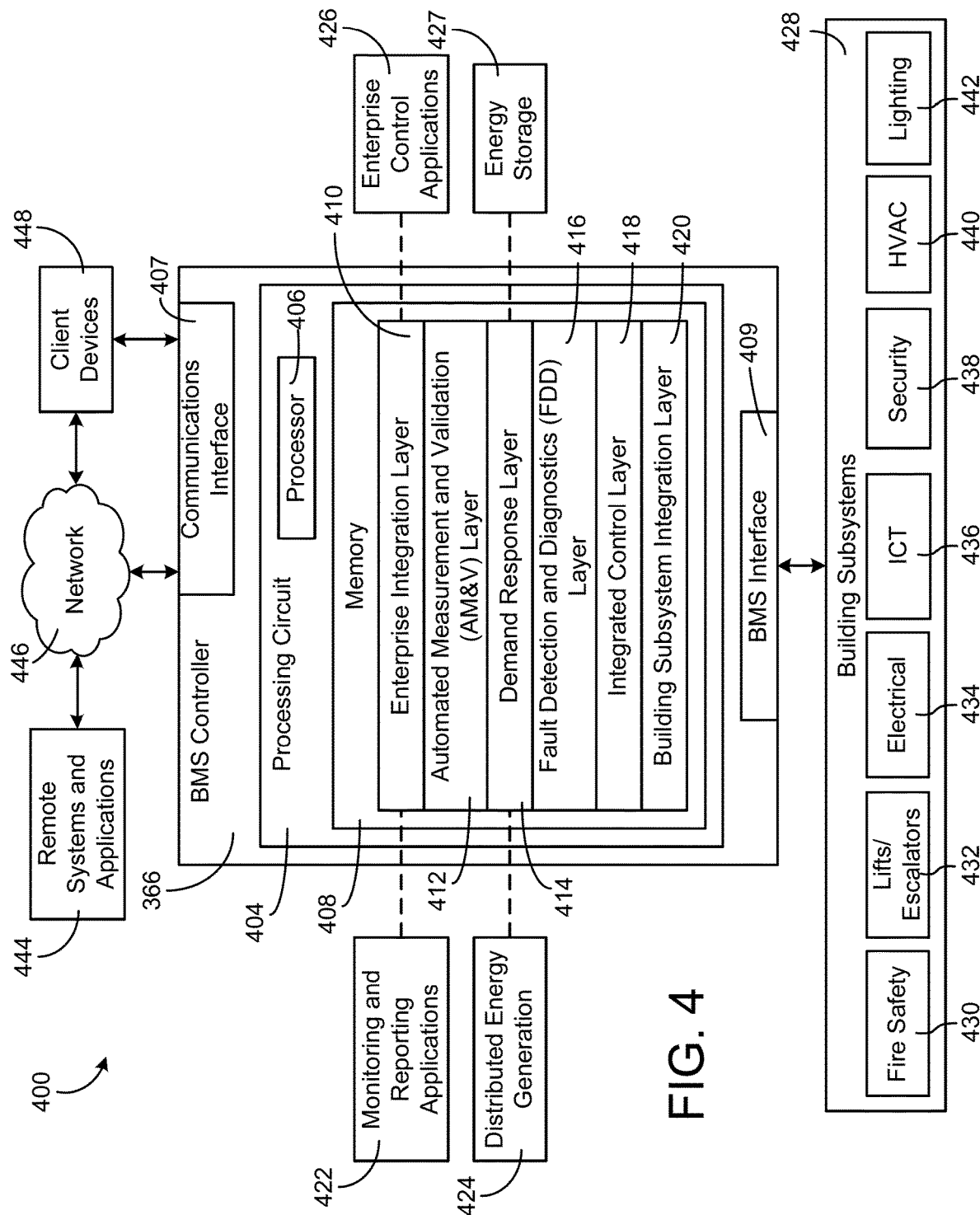
FIG. 4 is a block diagram of a building management system (BMS) which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing set points, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing set points) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what set points can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Multi-Tiered Data Storage System

Figure 5:
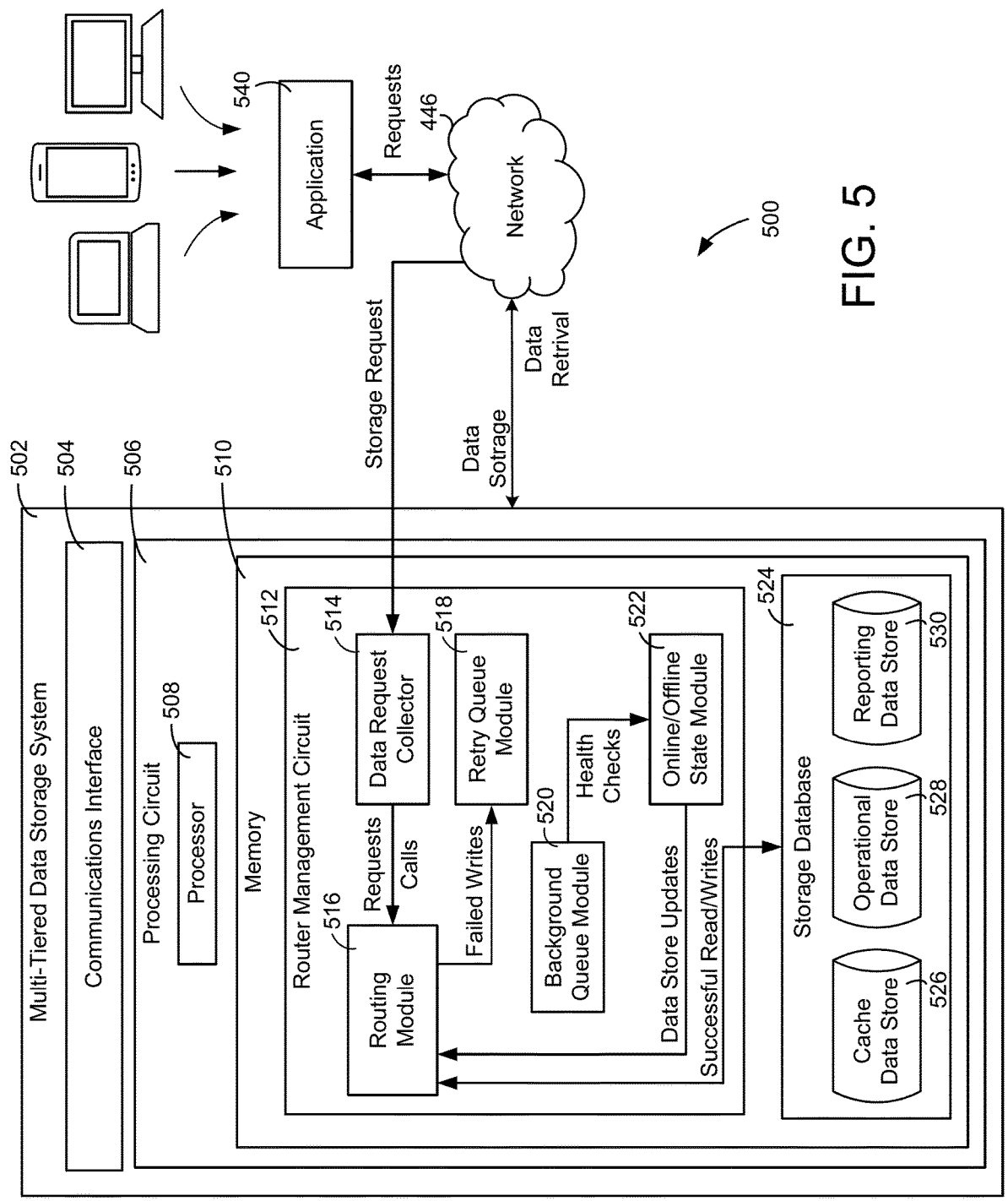
FIG. 5 is a block diagram of a data storage system, which can be used in the building of FIG. 1, according to some embodiments.

Referring now to FIG. 5, a system 500 for storing data, writing data, and satisfying data retrieval requests is shown, according to some embodiments. In some embodiments, system 500 receives data from one or more HVAC devices (e.g., BMS controller 366, one or more user devices, etc.) and stores the data in an efficient and optimal manner (e.g., via caching, directly to hard disk storage, directly to solid-state storage, etc.). In some embodiments, the method for storing the data is based on user instructions (e.g., "store data object A in cache data store," etc.). In other embodiments, the method for storing data is based on a software implemented to optimally store the data (e.g., certain data objects can only be stored in certain locations, some data stores may be at full capacity, etc.). System 500 may "store" the data but creating a copy of the data and storing the copy. For example, system 500 may receive a data object that is to be stored in an operational data store. In some embodiments, MTDSS 502 determines where the data object should be stored (e.g., if the data object should be cached and stored in cache data store 526, etc.). In other embodiments, a user request provides instructions for the data to be cached for ease of accessibility. Accordingly, a copy of the data object is created and stored in a cache data store.

In some embodiments, system 500 retrieves the requested data and provides the data to one of more devices (e.g., BMS controller 366, client devices 448, smartphones connected to network 446, workstations connected to network 446, etc.) based on one or more requests provided to system 500. In some embodiments, system 500 facilitates the storage methods required to optimally store certain data in locations that allow for quicker retrieval of certain pieces of data. For example, temperature sensor 362 positioned in supply air duct 312 may provide point data that is consistently requested by BMS controller 366. As such system 500 and the various components therein may cache the point data from temperature sensor 362 (e.g., in cache data store 526 (described in detail below)), in addition to storing the point data on a hard-disc drive or solid-state drive, such that BMS controller 366 can quickly access the point data.

In some embodiments, system 500 allows a building management system (BMS) application (e.g., enterprise control applications 426, application 540, etc.) to specify one or more data stores of various functional types (e.g., caching, operational, reporting, cold storage, etc.) and provide an interface to one or more users that delegates requests to the appropriate storage to handle online/offline status, backfilling, caching, and various other storage functions. The BMS application may provide a simplified interface that does not require the application to provide and/or develop methods for storing data. Particularly, system 500 may define the stores located within MTDSS 502 and various client applications (e.g., application 540, etc.) may be unaware of the store definitions. System 500 is shown to include multi-tiered data storage system 502, network 446, enterprise control applications 426, client devices 448, monitoring and reporting applications 444, and BMS controller 366.

Multi-tiered data storage system (MTDSS) 502 may be configured to handle the storage rules, algorithms, user requests, and functionalities required to store data relating to HVAC system 100, waterside system 200, airside 300, BMS system 400, or any combination thereof. In some embodiments, MTDSS 502 receives requests to store data in a certain manner from application 540 (e.g., via user instructions provided by a user using application 540) such as caching a set of data or storing a set of data in cold storage.

In some embodiments, MTDSS 502 automatically stores data that is being processed in application 540. In such embodiments, MTDSS 502 may store the data based on encoded instructions or may incorporate a neural network to store the data sets. A neural network may be implemented to use previous user requests as training data to determine the typical locations in which data is stored and/or the type of data that is being stored in particular locations. This may benefit MTDSS 502 by not requiring to search all databases to retrieve data, as a priori information allows MTDSS 502 to quickly read from the appropriate data store. MTDSS 502 may also be configured to provide the stored data to one or more devices (e.g., to BMS controller 366 for control inputs, to display on a smartphone hosting application 540, etc.) upon request or automatically. MTDSS 502 is shown to include communications interface 504 and processing circuit 506 including processor 508 and memory 510.

Communications interface 504 can facilitate communications between BMS controller 366 and external applications (e.g., application 540, monitoring and reporting applications 422, enterprise control applications 426, remote systems and applications 444, applications residing on client devices 448, etc.) for allowing user control, monitoring, and adjustment to BMS controller 366 and/or subsystems 428. Communications interface 504 can also facilitate communications between BMS controller 366 and client devices 448. Communications interface 504 can facilitate communications between BMS controller 366 and building subsystems 428 (e.g., HVAC, lighting security, lifts, power distribution, business, etc.).

In some embodiments, communications interface 504 can be or include wired or wireless communications interfaces (e.g., jacks, antennas, transmitters, receivers, transceivers, wire terminals, etc.) for conducting data communications with building subsystems 428 or other external systems or devices. In various embodiments, communications via communications interface 504 can be direct (e.g., local wired or wireless communications) or via a communications network 446 (e.g., a WAN, the Internet, a cellular network, etc.). For example, communications interface 504 can include an Ethernet card and port for sending and receiving data via an Ethernet-based communications link or network. In another example, communications interface 504 can include a Wi-Fi transceiver for communicating via a wireless communications network. In another example, communications interface 504 can include cellular or mobile phone communications transceivers. In one embodiment, communications interface 504 is a power line communications interface. In other embodiments, communications interface 504 is an Ethernet interface.

Processing circuit 506 can be communicably connected to communications interface 504 such that processing circuit 506 and the various components thereof can send and receive data via communications interface 504. Processor 508 can be a general purpose or specific purpose processor, an application specific integrated circuit (ASIC), one or more field programmable gate arrays (FPGAs), a group of processing components, or other suitable processing components. Processor 508 is configured to execute computer code or instructions stored in the memory or received from other computer readable media (e.g., CDROM, network storage, a remote server, etc.), according to some embodiments.

Memory 510 can include one or more devices (e.g., memory units, memory devices, storage devices, etc.) for storing data and/or computer code for completing and/or facilitating the various processes described in the present disclosure. Memory 808 can include random access memory (RAM), read-only memory (ROM), hard drive storage, temporary storage, non-volatile memory, flash memory, optical memory, or any other suitable memory for storing software objects and/or computer instructions. Memory 510 can include database components, object code components, script components, or any other type of information structure for supporting the various activities and information structures described in the present disclosure. Memory 510 can be communicably connected to the processor via the processing circuitry and can include computer code for executing (e.g., by the processor) one or more processes described herein. Memory 510 is shown to include router management circuit 512.

Router management circuit 512 may be configured to handle any and/or all of processing necessary to route data to and from MTDSS 502 and to store data sets in the various storage locations within MTDSS 502. Router management circuit 512 is shown to include data request collector 514, routing module 516, retry queue module 518, background queue module 520, and online/offline state module 522. In some embodiments, router management circuit is configured to handle processes 700-900 and the methods for implementing diagrams 1000-1500 as described below. Router management circuit 512 may be the primary processing circuitry for receiving storage requests (e.g., data write requests) and read requests, and facilitating an efficient solution to satisfy the requests.

Data request collector 514 may be configured to receive data requests from one or more devices (e.g., smartphones, tablets, monitors, workstations, etc.) via application 540. These requests may include read requests (e.g., a user wants a certain data set provided back to application 540, etc.), write requests (e.g., a user wants a data set stored within system 500 at a particular location, etc.), or both. Data request collect 514 may be incorporated partially or entirely into routing module 516. In some embodiments, data request collector 514, processes the requests and provides them to routing module 516.

Routing module 516 may be configured to receive the requests from data request collector 514 and provide read/write instructions to the various data stores (e.g., cache data store 526, operational data store 528, reporting data store 530, etc.). In some embodiments, routing module 516 receives a request (e.g., call) from data request collector 514 and makes routing decisions based on which data stores are online. The statuses of the data stores may be provided by online/offline state module 522 to determine which data stores need to be accessed to satisfy the incoming requests. Routing module 516 may also include the functionality of adjusting the status of one or more data stores from "online" to "offline." For example, routing module 516 may provide a write request to operational data store 528, but the write request fails. Routing module 516 may then update the status of operational data store 528 to "offline" (e.g., by sending instructions to online/offline state module 522, etc.).

Retry queue module 518 may be configured to retry read/write instructions that initially failed. These failures may be due to one or more data stores that are offline. Retry queue module 518 may wait for failed read/write instructions to appear in a retry queue, and retry them as they enter the retry queue. These failed read/write instructions may be provided by routing module 516 when a return message from the data store indicates that the read/write was a failure. Routing module 516 may then off-load the instructions to retry queue module 518. In some embodiments, router management circuit 512 will attempt to write data to a data store (e.g., as time series data, etc.) in one or more data storage locations.

Generally, as referred to herein, the data stores may refer to a repository or source for storing and managing collections of data which include databases, but can also include simpler store types (e.g., simple files, emails, etc.). In other embodiments, data store may refer to the way in which data is stored (e.g., relational, time series, document, etc.), the type of storage for the data (e.g., caching, operational, reporting, cold storage, etc.), or any combination thereof. For example, router management circuit 512 may write. Retry queue module 518 may, at times, request information (e.g., queued messages, etc.) from background queue module 520 relating to the status of various data stores. This can allow retry queue module 516 to re-send read/write requests to data stores that may have come back online. Retry queue module 518 may also receive data store information from online/offline state module 522, or any other component within router management circuit 512.

Background queue module 520 may be configured to monitor the various data stores within MTDSS 502 and provide tests (e.g., health checks, status checks, etc.) on the various data stores to determine how they are operating. For example, after cache data store 526 has been determined to be offline, background queue module 520 performs a health check on cache data store 526 and determines that cache data store 526 is back online, upon which the update can be provided routing module 516 for updated routing purposes. Background queue module 520 may be responsible for handling several secondary functions of MTDSS 502, such as emptying the query of retry queue module 518. Background queue module 520 is shown to provide health checks to online/offline state module 522.

Online/offline state module 522 may be configured to track, monitor, and/or store the statuses (e.g., states) of the various data stores within MTDSS 502. In some embodiments, online/offline state module 522 provides updates and statuses of the various data stores to other components with MTDSS 502. Online/offline state module 522 may be configured to receive health checks from background queue module 520 and data store updates from routing module 516. Router management circuit 512 is shown to provide reads and writes to storage database 524.

Storage database 524 may include some or all of the various data stores disclosed herein. Storage database 524 may be located within MTDSS 502 as shown in FIG. 5, or may be partially or entirely located within other processing circuits. For example, cache data store 526 may be located within MTDSS 502, reporting data store 530 is located on a separate server located on premise (e.g., also within building 10). In some embodiments, some or all of storage database 524 may be located off-premise (e.g., within the Cloud, dispersed over the Internet, etc.). The storage functionalities may be a result of the development of application 540, which is disclosed in greater detail below.

Cache data store 526 may include data that has been designated as cached data for application 540. For example, any instructions to cache data or automatic decisions to cache data sets may be sent to cache data store 526. In some embodiments, cache data store 526 stores data objects that can also be stored in operational data store 528. In other words, cache data store 526 may data that MTDSS 502 determines to be optimal within storage database 524, and not necessarily what is requested or desired for application 540. However in some embodiments, data may be cached in cache data store 526 at least in part to optimize read requests received by application 540. This may be done to provide a small amount of data (e.g., compared to the amount of data stored on a disk drive, etc.), when requested, that is provided at a significantly faster rate than in typical storage methods. For example, cache data store 526 may include static random access memory (RAM) that caches data from a hard drive and provides the data to application 540 when requested.

Operational data store 528 may be configured to store operational data relating to system 500 or any other system disclosed herein (e.g., HVAC system 100, waterside system 200, airside system 300, BMS 400). In some embodiments, operational data store 528 is a database designed to integrate data from multiple sources for additional operations on the data, reporting, controls and operational decision support. In some embodiments, the data is not passed back to operational systems and is provided to a data warehouse (e.g., enterprise data warehouse, etc.) for further reporting. In some embodiments, operational data store 528 is a central database that provides a snapshot of the latest data from multiple systems (e.g., HVAC system 100, etc.) for operational reporting.

Reporting data store 530 may be configured to hold data in a format optimized for access for reporting. In some embodiments, various other types of data stores (e.g., cache data store 526, operational data store 528, etc.) are optimized for their own purposes and may be inefficient for analysis and reporting (e.g., time-consuming queries, which can be optimized in a reporting data store to run quickly, etc.).

Application 540 may include some or all aspects of enterprise control applications 426 as described above. Application 540 may include one or more applications and be an application hosted directly on a user device (e.g., smartphones, laptops, workstations, tablets, etc.). Application 540 may be stored (e.g., processed, housed, etc.) on premise at one or more servers (e.g., within MTDSS 502, within BMS controller 366, within control applications 426, etc.) or off-premise (e.g., within the Cloud, via the internet, etc.), or any combination thereof. In other embodiments, application 540 is hosted via peer-to-peer services, wherein each computing device (e.g., smartphone) can act as a server for the other computing devices using application 540, allowing shared access to files and peripherals without the need for a central server.

Application 540 ("the application") may be configured to provide data storage options to a user of application 540. For example, an IP network technician that is configuring an IP network within building 10 may choose to store various gateway ID's for quicker retrieval during configuration, assuming that the various gateway ID's are stored within the database structure (e.g., MTDSS 502, etc.). MTDSS 502 may store the various gateway ID's (e.g., operational data) which may or may not be cache data. In various embodiments, application 540 is merely a software abstraction layer that presents a single consistent programmatic interface to other applications. Application 540 is shown providing requests to network 446. In some embodiments, users provide storage requests to network 446 and/or MTDSS 502.

Figure 6:
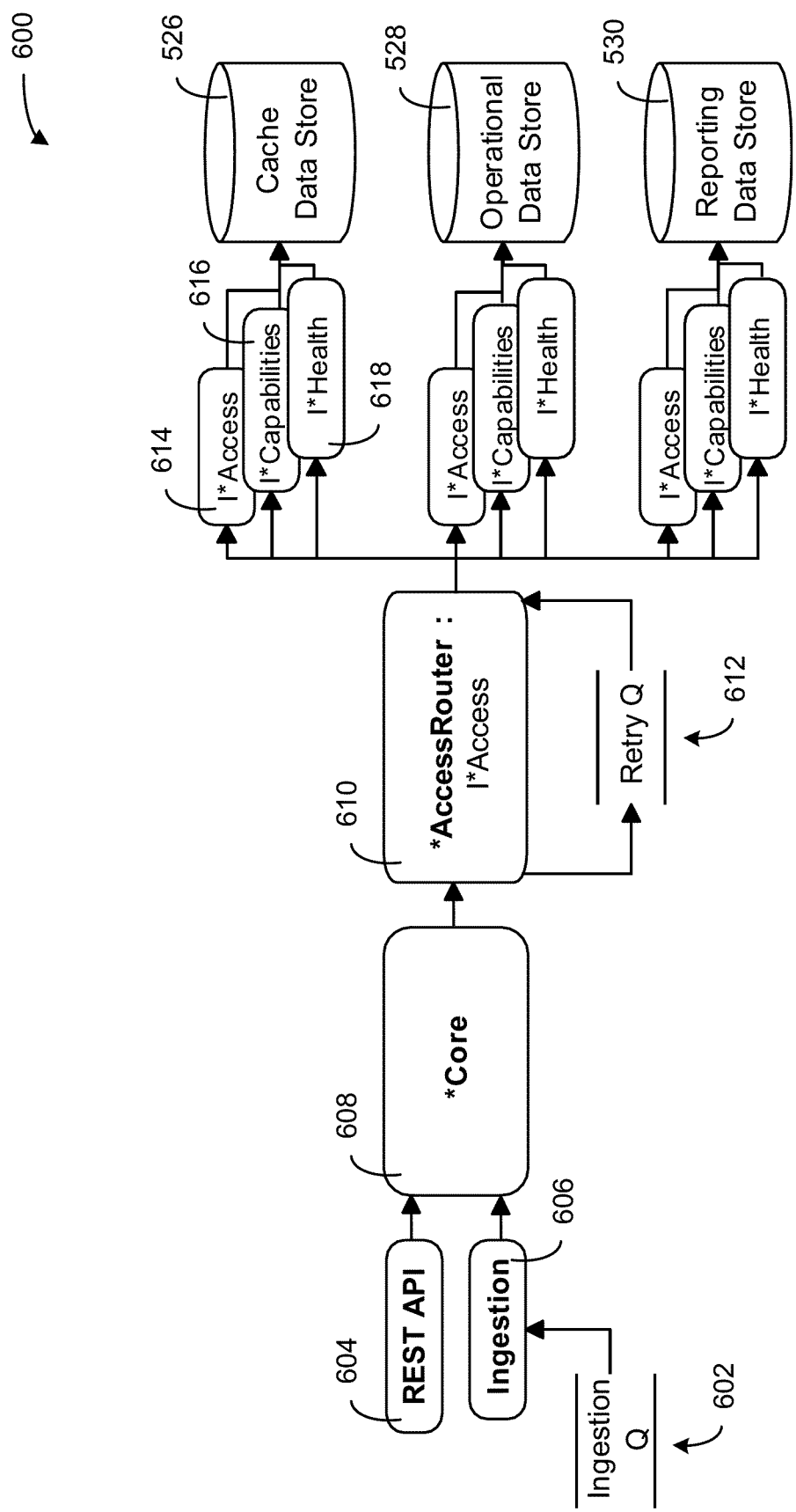
FIG. 6 is a diagram of a process for routing data to data stores, which can be implemented by the system of FIG. 5, according to some embodiments.

Referring now to FIG. 6, a diagram 600 for routing data to various data stores is shown, according to exemplary embodiments. Diagram 600 is shown to include ingestion queue 602, representational state transfer application programming interface (REST API) 604, core 608, access router 610, retry queue 612, access 614, capabilities 616, health 618, and data stores 526-530. In some embodiments, access router 610 is identical or substantially similar to routing module 516, retry queue 612 is identical or substantially similar to retry queue module 518, and communication interface 504 includes some or all of the functionality of REST API 604. Diagram 600 may show a routing device (e.g., TDMSS 502, etc.) retrieving data using REST API 604. The data is then provided to core 608 for various processing, including rollup services, sampling for unit conversions, and maintaining business logic. Core 608 may then provide the data to access router 610 (which may be similar or identical in functionality to routing module 516 or routing management circuit 512 or both) for appropriate routing to data stores 526-530. Access router 610 may also receive retry messages from retry queue 612, for any failed read/write instructions that need to be retried, or to notify access router 610 of any updated statues of data stores 526-530.

Data Storage Processes

Figure 7:
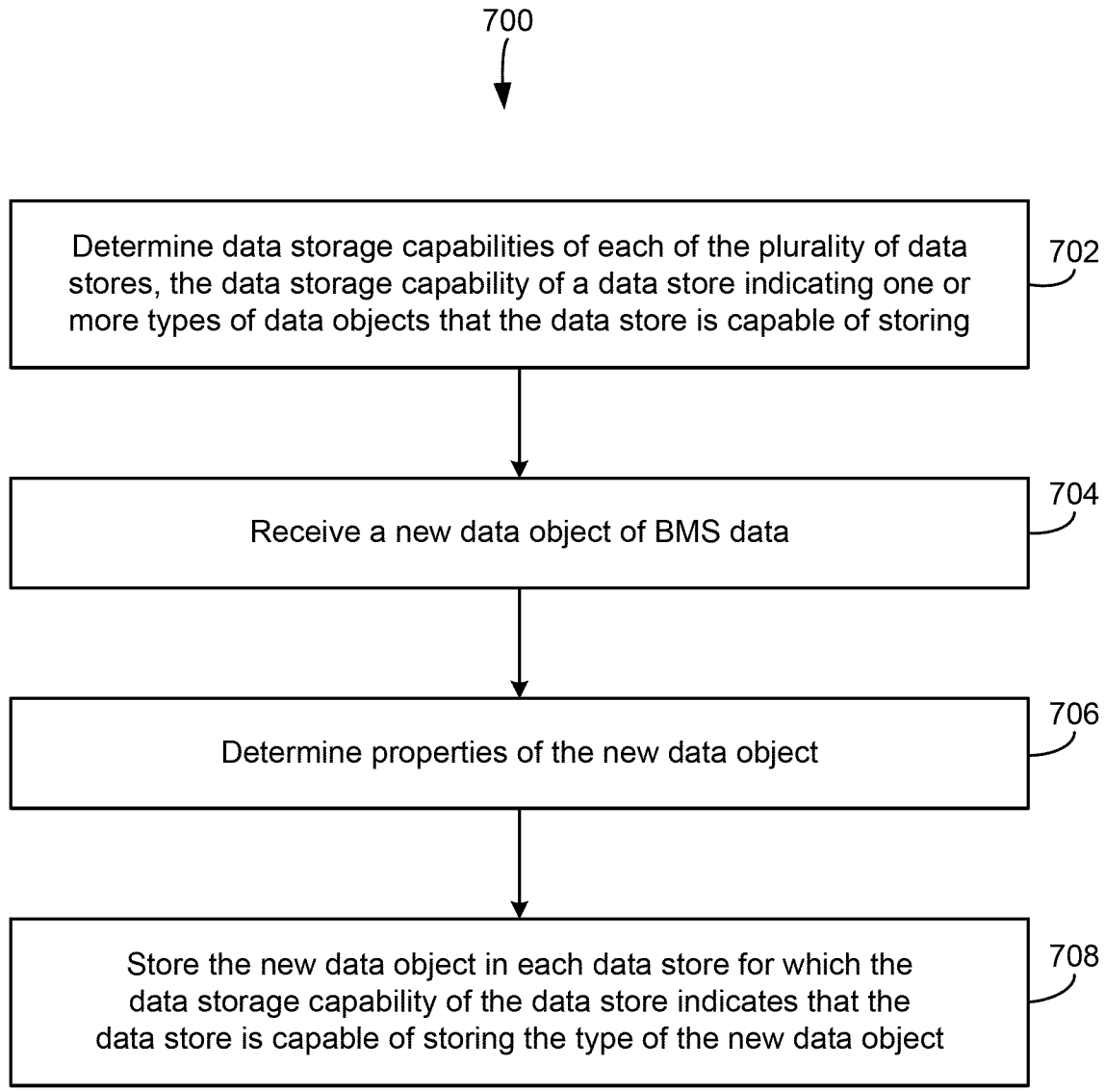
FIG. 7 is a flow diagram of a process for storing data in various data stores, which can be performed by the system of FIG. 5, according to some embodiments.

Referring now to FIG. 7, a process 700 for determining how to store newly acquired data objects is shown, according to exemplary embodiments. Process 700 may be performed by any of the processing circuits disclosed herein, particularly processing circuit 506 within MTDSS 502. In some embodiments, process 700 stores the newly acquired data (e.g., from a user via application 540, from BMS 400 and stored based on instructions from a user via application 540, etc.) by writing the data directly to the data stores, which may include creating copies of the data for particular data stores (e.g., cache data store 526, etc.).

Process 700 is shown to include determining data storage capabilities of each of the plurality of data stores, the data storage capability of a data store indicating one or more types of data objects that the data store is capable of storing (step 702). In some embodiments, step 702 analyzes data stores within storage database 524 to determine how incoming data objects should be stored. For example, BMS data for pump speed of a pump within waterside system 200 may not need to be readily accessed by HVAC technicians or analysts of the stored BMS data. As such, this data may be stored in operational data store 528 and does not need to be cached in cache data store 526. In some embodiments, application 540 queries MTDSS 502 prior to receiving a new data object to determine where the data object should be stored. This may be done to make sure the data stores have capacity to receive the new data or if the type of data being stored is an appropriate data type to be stored in that particular data store.

Process 700 is shown to include receiving a new data object of BMS data (step 704) and determining properties of the new data object (step 706). In some embodiments, data transmissions to and from system 500 are performed under building automation and control network (BACnet) protocols. Under BACnet protocols or other building automation protocols (e.g., MODBUS, etc.), data may be transmitted under a certain framework (e.g., data model) to facilitate communication across various building automation devices. As described herein, receiving a new data object can refer to a processing circuit (e.g., processing circuit 506) receiving data in the format as described by the data model. Under BACnet protocols, the data object refers to an instance of a class within a BACnet device.

For example, MTDSS 502 receives information from BMS controller 366. The information is a temperature reading from an analog input of BMS controller 366 (i.e., the data object). This analog input acts as an object for a BACnet device (i.e., BMS controller 366). The analog input (i.e., the object) contains a list of properties associated with the object. In the above example, the analog input object for a temperature reading may include the following properties:

present value, description, device type, and units. Under BACnet protocols, this "data object" can then be transmitted in such a way that another device in the system configured under BACnet protocols can read the data object and all of its properties. In the above example, BMS controller 366 provides the analog input data object to MTDSS 502. Router management circuit 512 then determines the appropriate routing for the newly acquired data object. This method of communication under building automation protocols can be especially useful if the various building automation devices (e.g., supervisory controllers, field controllers, virtual BAS devices, etc.) were not manufactured by the same vendor and/or are not initially designed to communicate with one another.

Process 700 is shown to include storing the new data object in each data store for which the data storage capability of the data store indicates that the data store is capable of storing the type of the new data object (step 708). In some embodiments, data stores within storage database 524 are only configured to store certain types of data objects. For example, cache data store 526 may only be configured to store binary input, binary out, and binary value data objects, as defined under BACnet protocols (as opposed to all 32 data objects defined under BACnet protocols). In some embodiments, step 708 may be performed by routing module 516 when storing (e.g., writing) data (e.g., data objects) to various data stores in storage database 524.

Figure 8:
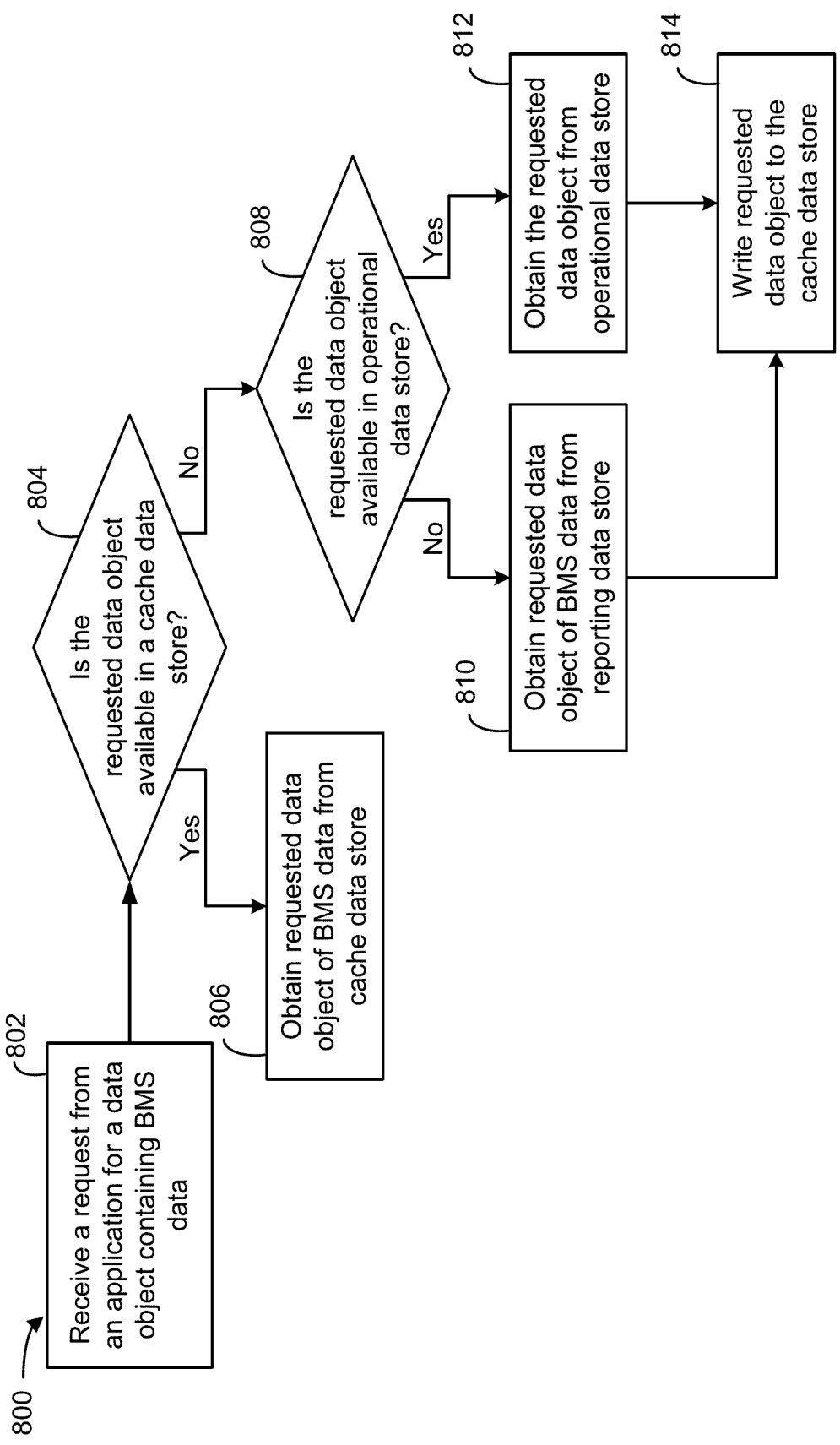
FIG. 8 is a flow diagram of a process for reading data from various data stores, which can be performed by the system of FIG. 5, according to some embodiments.

Referring now to FIG. 8, a process 800 for retrieving information to satisfy requests provided via an application is shown, according to exemplary embodiments. Process 800 may be performed after a data object has been optimally stored (e.g., after process 700). Process 800 may be performed by any of the processing circuits disclosed herein, particularly processing circuit 506 within MTDSS 502. In some embodiments, processes 700 and 800 can be performed simultaneously. For example, multiple read and write requests are provided to MTDSS 502 at or proximate the same time, required router management circuit 512 to read and write data simultaneously.

Process 800 is shown to include receiving a request from an application for a data object containing BMS data (step 802). In some embodiments, a user provides a request via application 540 for a data set stored in storage database 524. This request may be provided by a button or widget located on the user interface of the user's device (e.g., a smartphone) that is hosting application 540. In some embodiments, the request is simply a read request to read the data stored in storage database 524. In other embodiments, the request is a write request for changing, re-writing, and/or updating the data object.

Process 800 is shown to include determining if the requested data object available in a cache data store (step 804). In some embodiments, the methodology of process 800 includes searching each data store in storage database 524, determining whether the requested data object is stored therein, and, if not, searching the other data stores in a sequential order. Various other methodologies are considered, such as searching all data stores at once, or using a neural network to search the data store that the data object is most likely located in, or various other methods. In some embodiments, routing module 516 queries cache data store 526 to determine if the requested data object is located therein. In response to determining that the data object is located therein, routing module 516 may obtain the requested data object of BMS data from cache data store (step 806) and provide the data object back to the user via application 540. In response to determining that the data object is not located in cache data store 526, process 800 may continue to search the other data stores.

Process 800 is shown to include determining if the requested data object available in operational data store (step 808). Step 808 may be similar to step 804, but routing module 516 queries operational data store 528. Similarly, step 812 may be similar to step 806, wherein in response to the requested data object being in operational data store 528, routing module 516 reads the data object and provides the data object to the user via application 540. In response to the requested data object not being in operational data store 528, routing module 516 may retrieve the data object from reporting data store 530 (step 810). In some embodiments, a recently requested data object may be written to cache data store 526 in case another request for the data object is provided. Process 800 discloses this, wherein after obtaining the requested data object, the data object is written to the cache data store (step 814).

Figure 9:
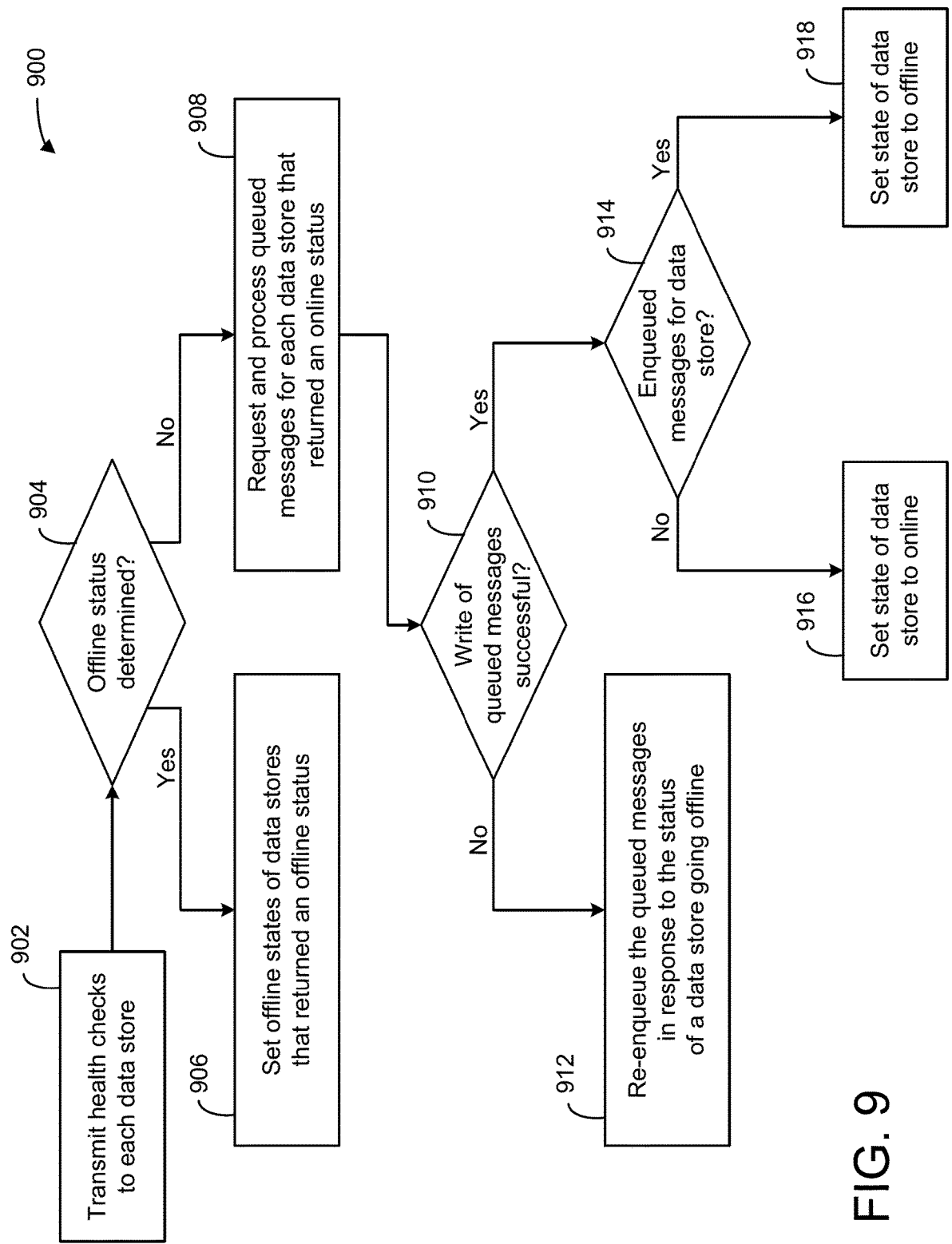
FIG. 9 is a flow diagram of a process for determining the status of various data stores, which can be performed by the system of FIG. 5, according to some embodiments.

Referring now to FIG. 9, a process 900 for determining the statuses of various data stores is shown, according to exemplary embodiments. Process 900 may be performed by any of the processing circuits disclosed herein, particularly processing circuit 506 within MTDSS 502. Process 900 may be performed after receiving a read request, process 900 discloses checking the various data stores to see where the requested data is located. While process 900 performs a sequential search, various other searching techniques are considered (described below).

Process 900 is shown to include transmitting health checks to each data store (step 902). In some embodiments, background queue module 520 provides health checks to online/offline status module 522. These health checks may include requests for status updates, data queries, or other methods for determining whether the various data stores are operating normally. In some embodiments, step 902 is performed to determine which data stores can be queried when a request is received. Step 902 may also be performed to determine which data stores are online for storing incoming data objects.

Process 900 is shown to include determining if an offline status is determined when checking the various data stores (step 904). In response to determining that a data store is offline, process 900 includes setting offline states of data stores that returned an offline status (step 906). In some embodiments, online/offline state module 522 provides the recent updates to routing module 516 so accurate routing may be implemented.

In response to determining that a data store is online, online/offline state module 522 may request and process queued messages for each data store that returned an online status (step 908). In some embodiments, messages may be generated within routing management circuit 512 that provide information relating to the data stores. For example, a summary of a health check may be a message provided to routing module 516 for analysis. Various types of messages are described in greater detail below with reference to FIGS. 10-15.

Process 900 is shown to include determining if the actions after receiving the queued messages (e.g., read instructions, write instructions, etc.) were successful (step 910). Routing module 516, upon determining the updates from the received messages, may implement one or more routing updates, such as storing a data object in a different location due to the original data store being offline. In response to the actions not being successful, routing module 516 may re-enqueue the queued messages in response to the status of a data store going offline (step 912). In response to the actions being successful, process 900 is shown to include determining if enqueued messages pertain the particular data store (step 914). If not, set state of data store to "online" status (step 916). If so, set state of data store to "offline" status (step 918).

While various embodiments disclosed herein discussed processing methods of MTDSS 502 (e.g., MTDSS 502 performing process 700, etc.), this is merely meant to be exemplary and various other processing circuitry may be configured to perform the various methods and processes disclosed herein. For example, while not shown explicitly in the FIGURES, application 540 may include some or all of the functionality required to process data objects, route data objects to appropriate data stores, and other data routing functionality. While MTDSS 502 is generally disclosed as being on premise in system 500 (e.g., within building 10), some or all functionality of MTDSS 502 may be implemented off-premise, within application 540, distributed peer-to-peer, distributed across various processing circuitry within building 10, or any combination thereof.

Data Routing Functionality

Figure 10:
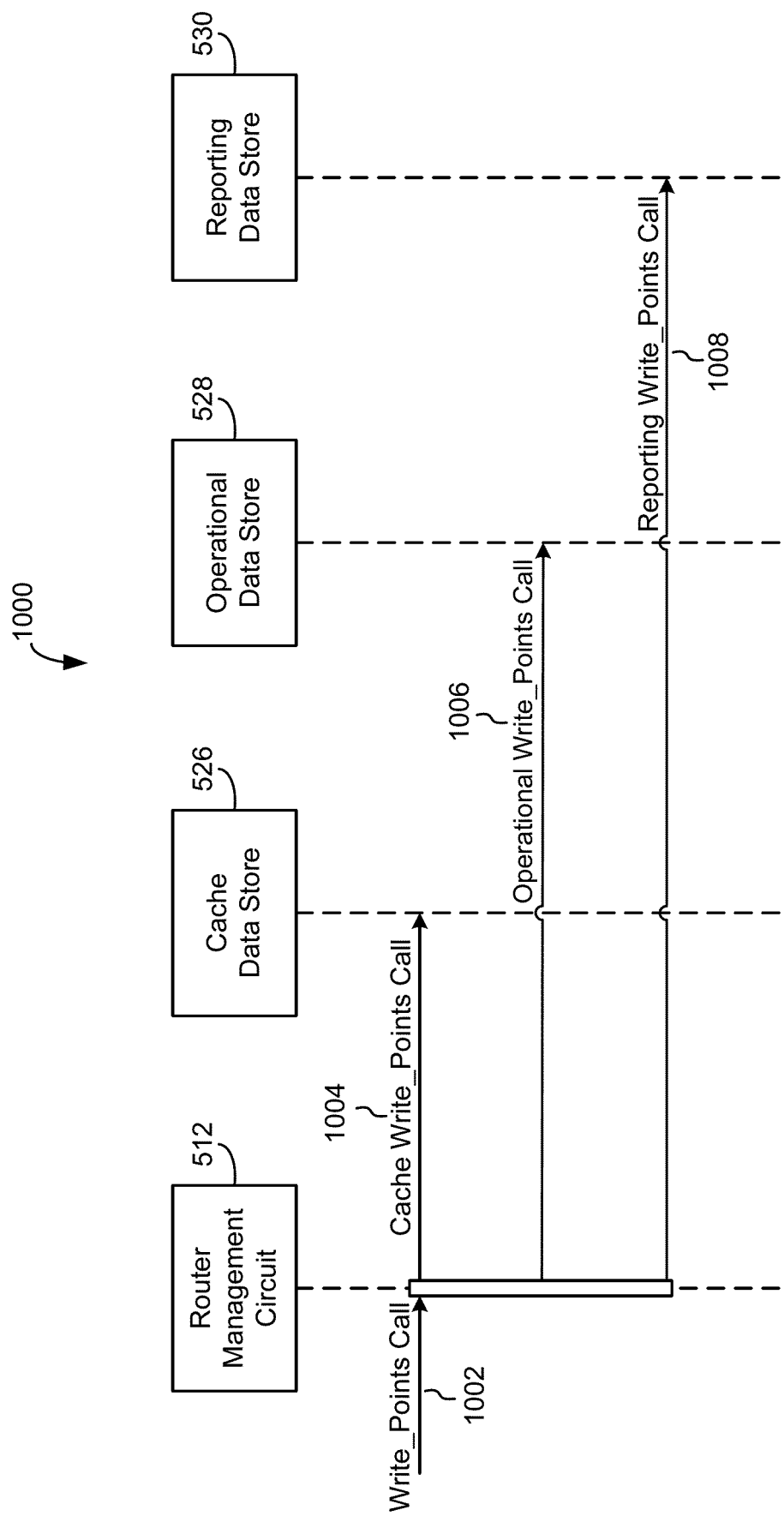
FIG. 10 is a sequence diagram for writing data to data stores, which can be performed by the system of FIG. 5, according to some embodiments.
Figure 11:
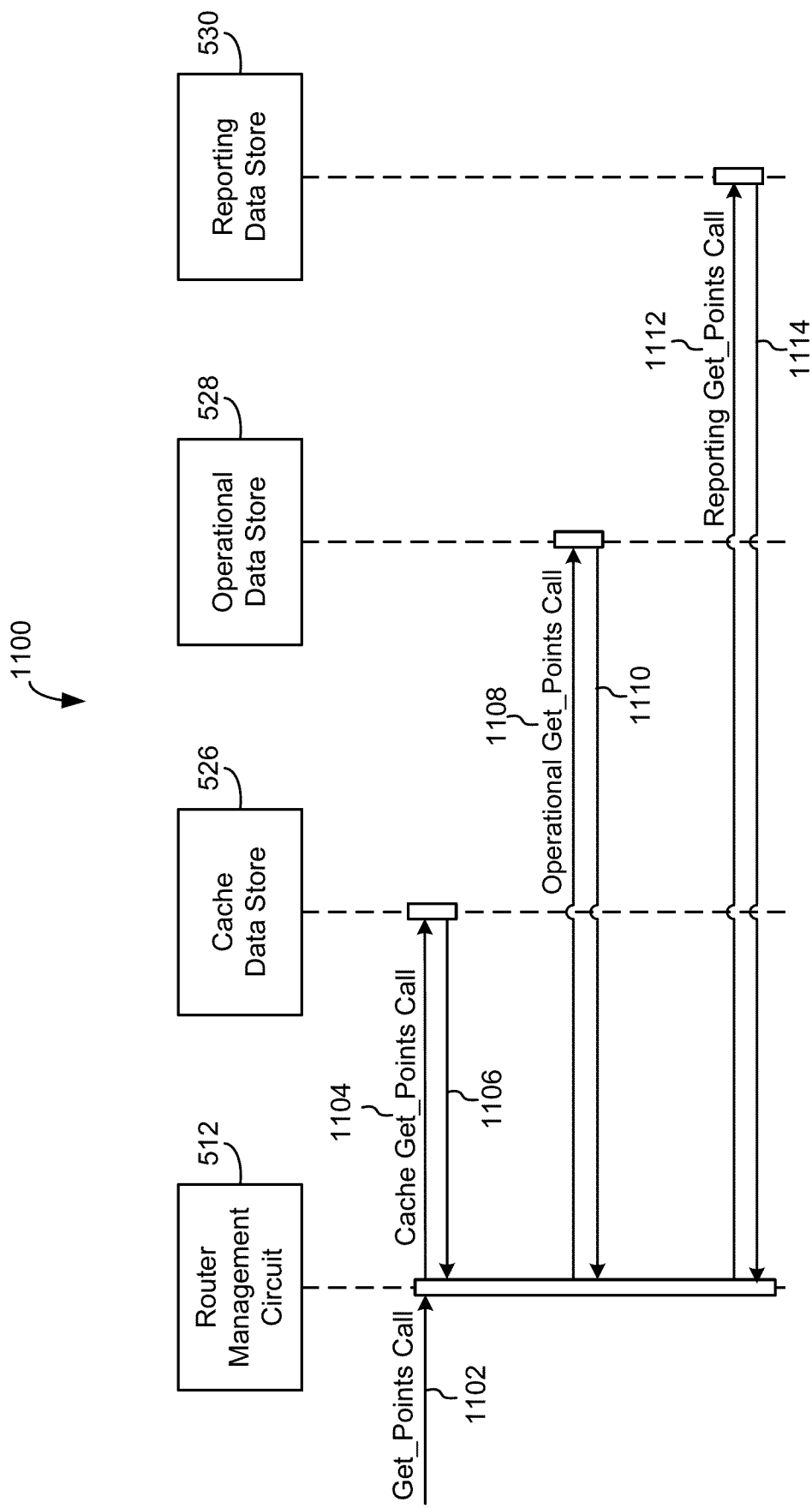
FIG. 11 is a sequence diagram for retrieving data from data stores, which can be performed by the system of FIG. 5, according to some embodiments.
Figure 12:
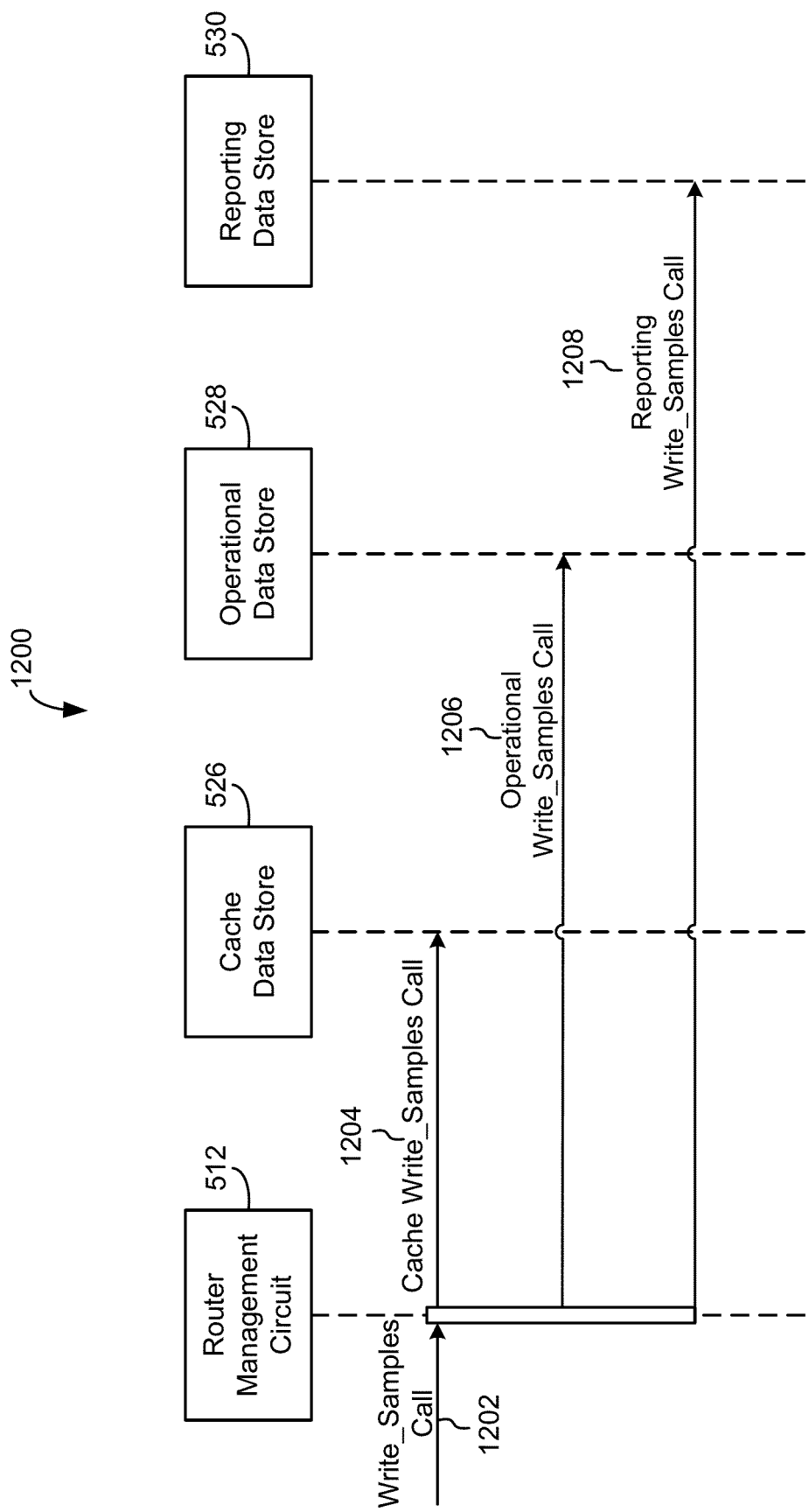
FIG. 12 is a sequence diagram for writing sampled data to data stores, which can be performed by the system of FIG. 5, according to some embodiments.

Referring now to FIGS. 10-15, various diagrams for showing routing sequences from router management circuit 512 to various data stores is shown, according to exemplary embodiments. FIGS. 10-12 (and similarly FIGS. 12-15) may resemble sequence diagrams. In some embodiments, sequence diagrams model the interactions between objects (e.g., data objects) in a single-use case. They can illustrate how the different parts of a system interact with each other to carry out a function, and the order in which the interactions occur when a particular use case is executed. In other words, a sequence diagram can show different parts of a system working in a "sequence" to complete a task.

Referring now to FIG. 10, diagram 1000 for writing data to various data stores is shown, according to exemplary embodiments. Diagram 1000 is shown to include four separate object lifelines: router management circuit 512, cache data store 5526, operational data store 528, and reporting data store 530. As disclosed herein, these object lifelines, when modeled in a sequence diagram such as diagram 1000, represent the existence of an object or component over a period of time. Diagram 1000 is also shown to include various messages over time, including Write_Points Call message ("write points message") 1002, Cache Write_Points Call message ("cache message") 1004, Operational Write_Points Call message ("operational message") 1006, and Reporting Write_Points Call message ("reporting message") 1008. These messages can indicate instructions, updates, or notifications that are provided from one object lifeline to another.

In some embodiments, diagram 1000 shows how some or all of process 800 may be implemented over a period of time. First, router management circuit 512 receives write points message 1002, instructing router management circuit 512 to begin writing the provided data object to the appropriate store. Immediately after, router management circuit 512 provides cache message 1004 to cache data store 526. This step may include cache data store 526 determining if the data object can and should be stored therein, and updating router management circuit 512 according. While not shown in diagram 1000, this updates in response to received messages, known as "return messages" can be diagramed to indicate the effect of the provided message. For example, cache data store 526 may provide a "FALSE" message back to router management circuit 512, indicating that the data object can and/or should not be stored therein, allowing router management circuit 512 to continue querying the other data stores. This process may continue in similar fashion to process 800 with operational message 1006 and reporting message 1008. In some embodiments, diagram 1000 may be written in a parallel format such that various sequences are shown occurring simultaneously.

Referring now to FIG. 11, diagram 1100 for receiving data from various data stores is shown, according to exemplary embodiments. Diagram 1100 may disclose a process for retrieving the data object that has been stored in one of the data stores, as outlined in process 800 for example. Diagram 1100 is shown to include the following messages: Get_Points Call message 1102, Cache Get_Points Call message ("cache get message") 1104, return cache message 1106, Operational Get_Points Call message ("operational message") 1108, return operational message 1110, Reporting Get_Points Call message ("reporting message") 1112, and return reporting message 1114.

In some embodiments, router diagram circuit 512 sends a get request (e.g., a message to receive data) to cache data store 526 (e.g., cache get message 1104). Cache data store 526 sends back return cache message 1106 indicating that the data object is not located in cache data store 526. Subsequently, router diagram circuit 512 sends a get request to operational data store 528. Operational data store 528 sends back a return operational message indicating that the data object is not located in operational data store 528. Finally, router management circuit 512 sends reporting message 114 to reporting data store 530. Reporting data store 530 sends back return reporting message 116 indicating that the data object is located in reporting data store 530.

Referring now to FIG. 12, a diagram 1200 for writing data samples to various data stores is shown, according to exemplary embodiments. Diagram 1200 is shown to include Write_Samples Call message 1202, Cache Write_Samples Call message 1204, Operational Write_Samples Call 1206, and Reporting Write_Samples Call message 1208. In some embodiments, diagram 1200 shows a processes for writing sampled data to the various data stores. In some embodiments, some of the received data to system 500 is sampled for a variety of reasons (e.g., unit conversion, digital signal processing (DSP), etc.) and the sampled data may need to be stored in the appropriate location (e.g., one of the data stores in storage database 524). In some embodiments, various write requests may occur in parallel and multiple instances of data stores may be implemented. For example, a write request may be performed across several data stores of the same time in parallel form (e.g., as opposed to serial, etc.) and there may be no dependency between the write request, as opposed to read requests. In the event that there or multiple stores of a single type (e.g., multiple cache data stores) then a read may be performed across all stores of that single type in parallel.

Diagram 1200 shows router management circuit 512 receiving message 1202 and writing sampled data to cache data store 526 and operational data store 528 via messages 1204 and 1206, respectively. In some embodiments, router management circuit 512 may also write samples to reporting data store 530, as shown by message 1208. As disclosed herein, read/write requests for sampled data may differ than traditional data in that the sampled data may include only the value of the data object (e.g., or a property of the data object), rather than the entire data object. Accordingly, router management circuit 512 may be configured to store and provide data objects and sampled data. In other embodiments, sampled data refers to data that is taken from a continuous data source (e.g., sampling an analog voltage source every 50 ms, etc.) and is therefore "sampled" from the original source.

Figure 13:
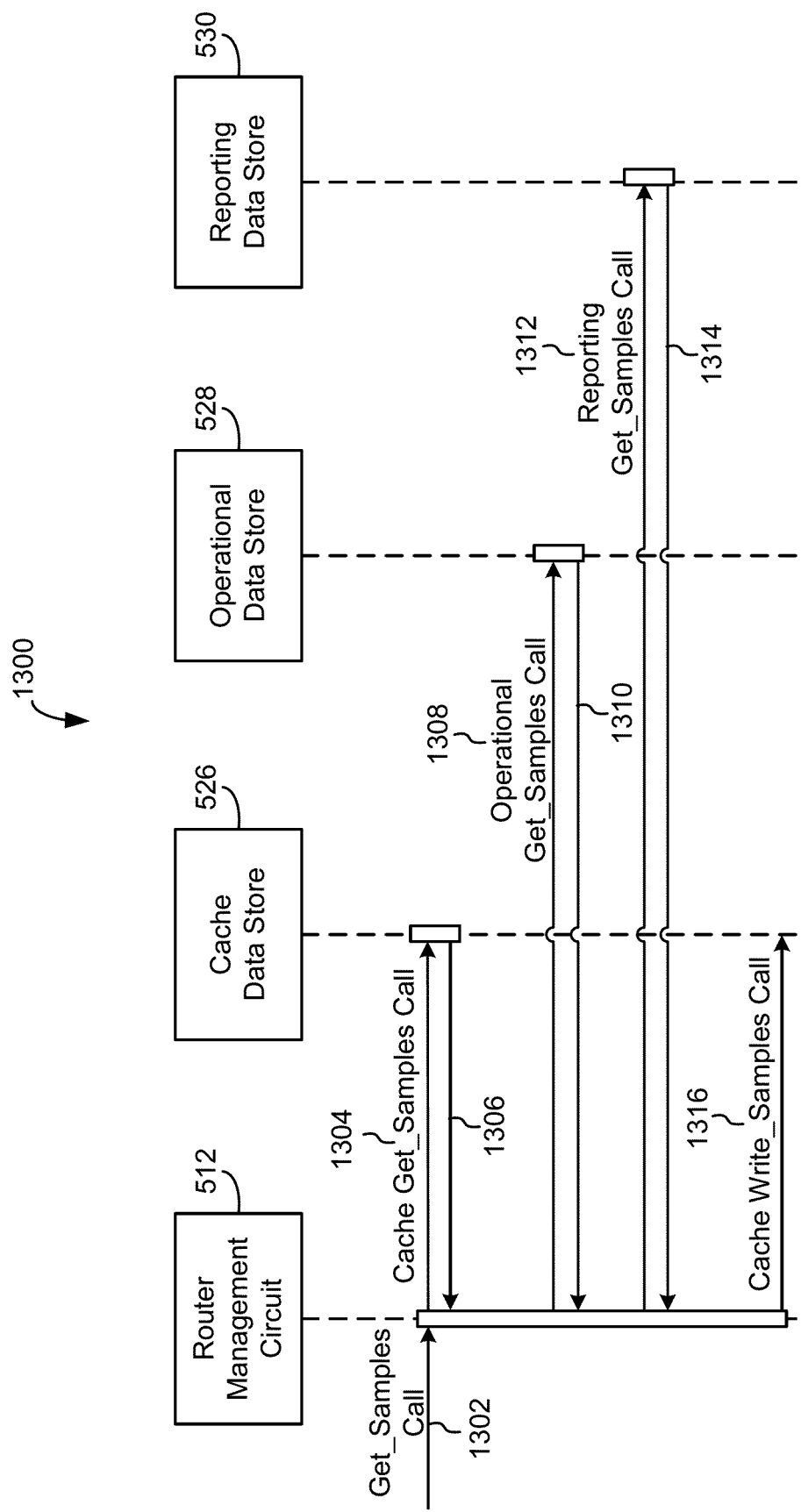
FIG. 13 is a sequence diagram for reading sampled data from data stores, which can be performed by the system of FIG. 5, according to some embodiments.

Referring now to FIG. 13, a diagram 1300 for retrieving data samples from various data stores is shown, according to exemplary embodiments. Diagram 1300 is shown to include Get Samples Call message 1302, Cache Get Samples Call message 1304, return cache message 1306, Operational Get Samples Call message 1308, return operational message 1310, Reporting Get Samples Call message 1312, return reporting message 1314, and Cache Write_Samples Call message 1316. Diagram 1300 may be similar to diagram 1100 but for retrieving sampled data.

Figure 14:
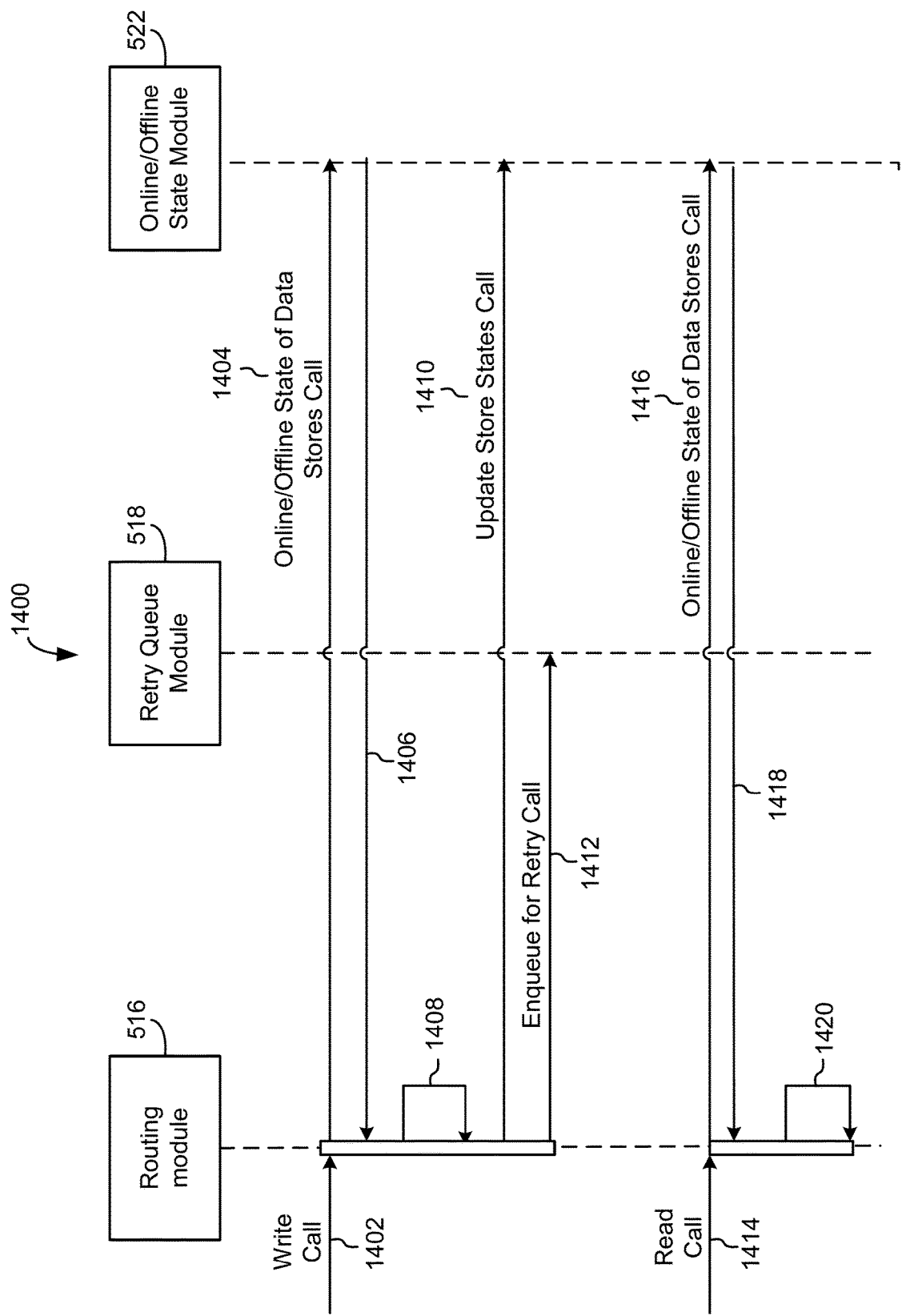
FIG. 14 is a sequence diagram reading and writing to data stores, which can be performed by the system of FIG. 5, according to some embodiments.

Referring now to FIG. 14, a diagram 1400 showing reading and writing functionality for data objects in various data stores is shown, according to exemplary embodiments. Diagram 1400 is shown to include write call message 1402, online/offline state of data stores call message 1404, return online/offline state message 1406, write message 1408, update store states call message 1410, enqueue for retry call message 1412, read call message 1414, online/offline state of data stores call message 1416, return online/offline state message 1418, and read message 1420.

Diagram 1400 shows routing module 516 receiving message 1402 and providing message 1404 to online/offline state circuit 522 to determine the operation states of the data stores (e.g., online, offline, etc.). Online/offline state module 522 may then provide return message 1406 to routing module 516 indicating the updated statues of the data stores. In some embodiments, routing module 516 writes the updates and/or other routing information to an online store (e.g., one or more data stores accessed through the internet, etc.), as shown by write message 1408. In some embodiments, routing module 516 receives updates of the various data stores from online/offline state module 522 and updates the data stores according. In other embodiments, routing module 516 provides instructions to online/offline state module 522 to update the store states, as shown by message, 1410. Routing module 516 may also be configured to update a retry queue via retry queue module 518 in the event the one or more offline data stores do not receive a write message.

In some embodiment's, routing module 516 also receives read messages, such as message 1414, providing instructions to retrieve data stored in the various data stores. Routing module 516 may provide read messages to the data stores and receive return messages, such as message 1418, indicating the status of the data stores. This may tell routing module 516 whether any of the data stores that need to be read are offline. In some embodiments, routing module 516 processes these updates and stores them in an online data store, as shown in read message 1420.

In some embodiments, write messages from routing module 516 do not fail, and any failure of a data store to accept a write (e.g., due to a new failure, due to an existing offline state, etc.) will result in the write message being queued to a retry queue and the data store state being set to (or continue to be) offline. In some embodiments, if data is returned to routing module 516, the data is the most current available, and any data store that is off-line (and potentially out of date) will not be used for read operations.

Figure 15:
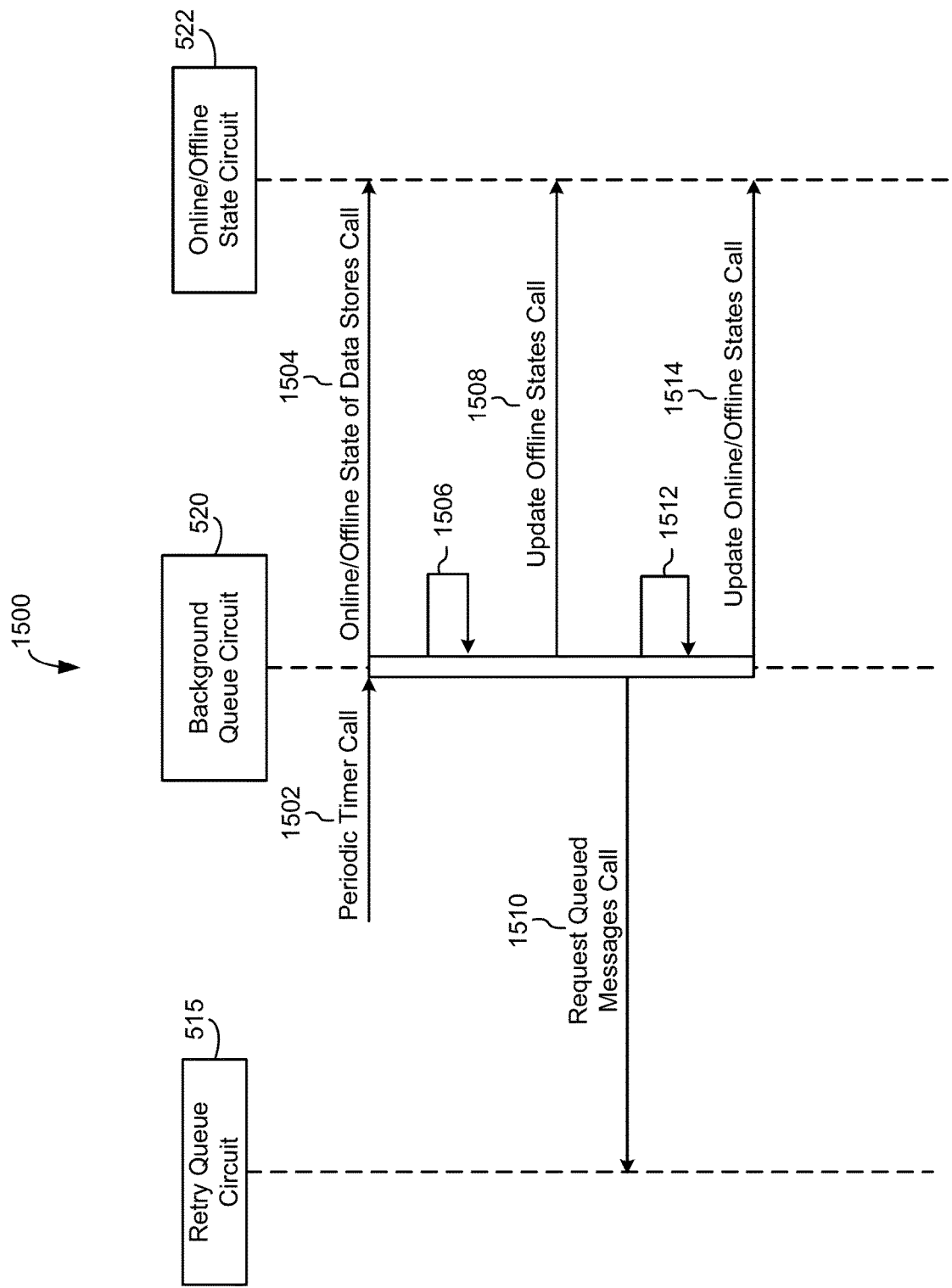
FIG. 15 is a sequence diagram for determining the status of various data stores, which can be performed by the system of FIG. 5, according to some embodiments.

Referring now to FIG. 15, a diagram 1500 showing reading and writing functionality for data objects in various data stores is shown, according to exemplary embodiments. Diagram 1500 is shown to include periodic timer call message 1502, online/offline state of data stores call message 1504, health check message 1506, update offline states call message 1508, request queued messages call message 1510, processing message 1512, and update online/offline states call message 1514. Diagram 1500 may disclose various methods after router management circuit 512 receives a read request.

Background queue circuit 520 is shown receiving periodic timer call message 1502. This may indicate the time periods in which background queue circuit 520 should provide health checks to online/offline state circuit 522, as shown by message 1504. While not shown in diagram 1500, online/offline state circuit 522 may provide a return message indicating which data stores are online and/or which data stores can provide the requested data. Background queue circuit 520 may also include functionality to send health checks to all data stores in system 500, including those located off premise, as shown by message 1506.

After a period of time, background queue module 520 may receive information that one or more data stores have gone online. This information may come directly from routing module 516 upon failing a read or write request. In response to determining that one or more data stores have gone online, background queue circuit 520 may update the states of the data stores for the rest of the components within MTDSS 502 by providing update instructions to online/offline state circuit 522. The status of the data stores may also take into account how retried read/write instructions have worked based on requesting a status update from retry queue circuit 518. While, not shown in diagram 1500, a return message may be provided by retry queue circuit 518 to background queue module 520 indicating which retried instructions have been completed and which retried instructions have still failed, wherein background queue module 520 processes this information as shown by message 1512. Background queue module 520 may continue to update the status of the data stores based on both health checks and the status updates from retry queue module 518, as shown by message 1514.

In some embodiments, one or more types of data stores may be included within MTDSS 502 that may be the same or different types of data stores. For example, a first data store stored in MTDSS 502 may be operational data store 528, and a second data store in MTDSS 502 may be cache data store 526. Additional stores may further be included within MTDSS 502. In using the above example, a third data store in MTDSS 502 may be reporting data store 530.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method operations may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A multi-tiered data storage system for building management system (BMS) data, the data storage system comprising:
    a plurality of data stores comprising:
        a first data store configured to store the BMS data, the BMS data comprising (1) a value of a variable state or condition represented by the BMS data and (2) a timestamp indicating a time at which the variable state or condition represented by the BMS data occurs; and
        a second data store configured to store a redundant copy of at least a portion of the BMS data stored in the first data store; and
    a data access router configured to:
        provide a consistent endpoint for the BMS data to an application that provides or consumes the BMS data regardless of whether the BMS data is stored in the second data store or the first data store;
        obtain a requested data object of the BMS data from the second data store in response to a determination that the requested data object is available in the second data store;
        obtain the requested data object from the first data store in response to a determination that the requested data object is not available in the second data store; and
        determine whether to store the BMS data in the first data store or the second data store based on the timestamp of the BMS data indicating the time at which the variable state or condition represented by the BMS data occurs.

2. The multi-tiered data storage system of claim 1, wherein:
    the first data store is an operational data store;
    the second data store is a cache data store;
    the plurality of data stores further comprise a reporting data store; and
    the data access router is configured to provide the consistent endpoint to the application that provides or consumes the BMS data regardless of whether the BMS data is stored in the first data store, second data store, or the reporting data store.

3. The multi-tiered data storage system of claim 1, wherein the requested data object comprises at least one of:
    a point data object comprising metadata describing a point in the BMS; or
    a sample data object comprising a value of the point in the BMS.

4. The multi-tiered data storage system of claim 1, wherein the data access router is configured to write the requested data object to the second data store after retrieving the requested data object from the first data store.

5. The multi-tiered data storage system of claim 1, wherein the data access router is configured to write the requested data object to the second data store response to a determination that the requested data object is a most recent version of the requested data object.

6. The multi-tiered data storage system of claim 1, wherein the data access router is configured to:
    receive a new data object of the BMS data from the application; and
    write the new data object to both the second data store and the first data store.

7. The multi-tiered data storage system of claim 1, wherein:
    the first data store is configured to store multiple values of a data object of the BMS data, the multiple values comprising a most recent value of the data object and one or more outdated values of the data object; and
    the second data store is configured to store only the most recent value of the data object.

8. The multi-tiered data storage system of claim 1, wherein the data access router is configured to:
    determine a data storage capability of each of the plurality of data stores, the data storage capability of a data store indicating one or more types of data objects that the data store is capable of storing;
    in response to receiving a new data object of the BMS data, determine a type of the new data object; and
    store the new data object in each data store of the plurality of data stores for which the data storage capability of the data store indicates that the data store is capable of storing the type of the new data object.

9. The multi-tiered data storage system of claim 1, wherein the data access router is configured to:
    determine whether the requested data object is a most recent version of the requested data object in response to a determination that the requested data object is available in the second data store; and
    remove the requested data object from the second data store in response to a determination that the requested data object is not the most recent version of the requested data object.

10. A method for storing data for a building management system (BMS), the method comprising:
providing a consistent endpoint for BMS data to an application that provides or consumes the BMS data regardless of whether the BMS data is stored in a first data store or a second data store, wherein the BMS data comprises (1) a value of a variable state or condition represented by the BMS data and (2) a timestamp indicating a time at which the variable state or condition represented by the BMS data occurs;
obtaining a requested data object of the BMS data from the second data store in response to a determination that the requested data object is available in the second data store;
obtaining the requested data object from the first data store in response to a determination that the requested data object is not available in the second data store; and
determine whether to store the BMS data in the first data store or the second data store based on the timestamp of the BMS data indicating the time at which the variable state or condition represented by the BMS data occurs, wherein:
the first data store is configured to store the BMS data; and
the second data store is configured to store a redundant copy of at least a portion of the BMS data stored in the operational data store.

11. The method of claim 10, wherein:
the first data store is an operational data store;
the second data store is a cache data store; and
the method further comprises providing the consistent endpoint to the application that provides or consumes the BMS data regardless of whether the BMS data is stored in the cache data store, the operational data store, or a reporting data store.

12. The method of claim 10, wherein the requested data object comprises at least one of:
a point data object comprising metadata describing a point in the BMS; or
a sample data object comprising a value of the point in the BMS.

13. The method of claim 10, wherein the method further comprises writing the requested data object to the second data store after retrieving the requested data object from the first data store.

14. The method of claim 10, wherein the method further comprises writing the requested data object to the second data store response to a determination that the requested data object is a most recent version of the requested data object.

15. The method of claim 10, wherein the method further comprises
receiving a new data object of the BMS data from the application; and
writing the new data object to both the second data store and the first data store.

16. The method of claim 10, wherein:
the first data store is configured to store multiple values of a data object of the BMS data, the multiple values comprising a most recent value of the data object and one or more outdated values of the data object; and
the second data store is configured to store only the most recent value of the data object.

17. The method of claim 10, wherein the method further comprises:
determining a data storage capability of each of the plurality of data stores, the data storage capability of a data store indicating one or more types of data objects that the data store is capable of storing;
in response to receiving a new data object of the BMS data, determining a type of the new data object; and
storing the new data object in each data store of the plurality of data stores for which the data storage capability of the data store indicates that the data store is capable of storing the type of the new data object.

18. The method of claim 10, wherein the method further comprises:
determining whether the requested data object is a most recent version of the requested data object in response to a determination that the requested data object is available in the second data store; and
removing the requested data object from the second data store in response to a determination that the requested data object is not the most recent version of the requested data object.

19. A building management device for storing building management system (BMS) data, the building management device comprising one or more processing circuits configured to:
provide a consistent endpoint for BMS data to an application that provides or consumes the BMS data regardless of whether the BMS data is stored in a first data store or a second data store, wherein the BMS data comprises (1) a value of a variable state or condition represented by the BMS data and (2) a timestamp indicating a time at which the variable state or condition represented by the BMS data occurs;
obtain a requested data object of the BMS data from the second data store in response to a determination that the requested data object is available in the second data store;
obtain the requested data object from the first data store in response to a determination that the requested data object is not available in the second data store; and
determine whether to store the BMS data in the first data store or the second data store based on the timestamp of the BMS data indicating the time at which the variable state or condition represented by the BMS data occurs,
wherein:
the first data store is configured to store the BMS data; and
the second data store is configured to store a redundant copy of at least a portion of the BMS data stored in the first data store.

20. The device of claim 19, wherein:
the first data store is an operational data store;
the second data store is a cache data store; and
the one or more processors are further configured to provide the consistent endpoint to the application that provides or consumes the BMS data regardless of whether the BMS data is stored in the cache data store, the operational data store, or a reporting data store.

21. The system of claim 1, wherein determining whether to store the BMS data in the first data store or the second data store based on the timestamp of the BMS data comprises:
comparing the timestamp to a time threshold; and
determining whether to store the BMS data in the first data store or the second data store based on whether the timestamp is before or after the time threshold.

22. The system of claim 1, wherein determining whether to store the BMS data in the first data store or the second data store based on the timestamp of the BMS data comprises:
comparing the timestamp to a time threshold; and moving the BMS data from the second data store to the first data store responsive to determining that the timestamp is before the time threshold.

\* \* \* \* \*